(12) United States Patent
Kuhr et al.

(10) Patent No.: US 7,827,160 B2
(45) Date of Patent: Nov. 2, 2010

(54) MANAGING DISTRIBUTED INDEX DATA

(75) Inventors: Gernot Kuhr, Leimen (DE); Olaf Schmidt, Walldorf (DE); Martin P. Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 251 days.

(21) Appl. No.: 11/694,335

(22) Filed: Mar. 30, 2007

(65) Prior Publication Data

US 2008/0243781 A1 Oct. 2, 2008

(51) Int. Cl.
*G06F 7/00* (2006.01)
*G06F 17/30* (2006.01)

(52) U.S. Cl. ............ 707/705; 707/741; 707/774; 709/201; 709/202

(58) Field of Classification Search ............ 707/2, 707/3, 4, 5, 10, 104.1, 202, 203, 204, 600–899, 707/999.001–999.206
See application file for complete search history.

(56) References Cited

U.S. PATENT DOCUMENTS

| 5,960,194 | A * | 9/1999 | Choy et al. ............ 707/102 |
| 6,178,418 | B1 * | 1/2001 | Singer ............ 707/3 |
| 6,439,783 | B1 * | 8/2002 | Antoshenkov ............ 1/1 |
| 6,901,418 | B2 * | 5/2005 | Gonos ............ 707/204 |
| 7,222,142 | B2 | 5/2007 | Fischer et al. |
| 7,451,148 | B2 * | 11/2008 | Childress et al. ............ 707/9 |
| 2006/0126619 | A1 * | 6/2006 | Teisberg et al. ............ 370/389 |
| 2006/0225055 | A1 * | 10/2006 | Tieu ............ 717/141 |
| 2007/0011143 | A1 * | 1/2007 | Fuh et al. ............ 707/3 |
| 2007/0250531 | A1 * | 10/2007 | Wiggins et al. ............ 707/102 |

OTHER PUBLICATIONS

Partition (database)—Wikipedia, the free encyclopedia, "*Partition (database),*" [online], <http://en.wikipedia.org/wiki/Partition_%28database%29>, retrieved Jul. 6, 2007, 2 pages.

* cited by examiner

*Primary Examiner*—Mohammad Ali
*Assistant Examiner*—Angelica Ruiz
(74) *Attorney, Agent, or Firm*—Fish & Richardson P.C.

(57) ABSTRACT

This disclosure provides various embodiments of systems, methods, and software for managing distributed index data. For example, in one embodiment, software for managing distributed index data may identify a query for one or more data objects from a data repository using a generic index, map the query to one of a plurality of logically distributed indices according to at least one rule, and execute the mapped query using the particular distributed index to retrieve the one or more data objects. Each distributed index may be in a disparate index repository that is on a disparate storage device. In some aspects, the one or more rules may include a plurality of business rules, as well as at least one technical rule, which may be stored in a rules repository. In further aspects, an administration view may be presented to a client such that one of the business rules is customized.

21 Claims, 5 Drawing Sheets

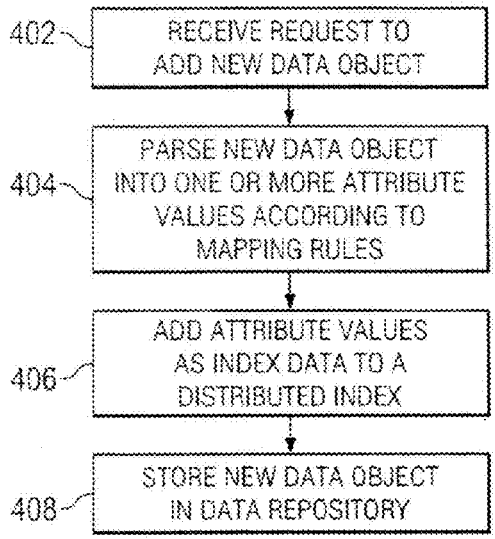
FIG. 4
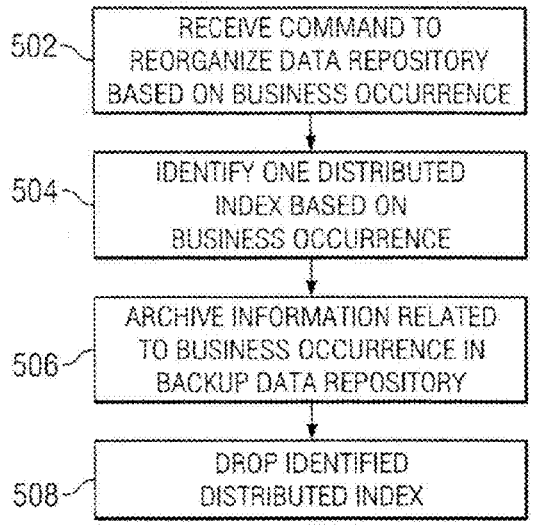
FIG. 5
FIG. 6

MANAGING DISTRIBUTED INDEX DATA

TECHNICAL FIELD

This disclosure relates to data management and, more particularly, to systems, methods, and software for implementing, utilizing, or otherwise managing distributed index data.

BACKGROUND

Businesses may produce large amounts of data over the course of time. In order to enable access to the data in an expedient fashion, the business data may be indexed. An index may allow for the retrieval of the data, e.g., a data object, from a repository, for example, a database. Because data-volume may increase significantly over time, indices may also grow rapidly. As a particular index grows, a capacity of the index may be reached, thus preventing the insertion of additional data into the index. Further, existing business data or business process data may be subjected to a modification because of a reorganization of the data. The reorganization may be performed due to a reorganization of a business such as, for example, the purchase or sale of one business by another. Such modifications can be related to a logically connected subset of the overall index, yet require consideration of the complete dataset (i.e., all data within the overall index) in order to identify the relevant subset of data. In another example, business data or business process data may not be required to be maintained in, for example, an end-of-life scenario. Thus, logically connected index data that may no longer be needed would be removed from the index. This removal often leads to a fragmented index.

SUMMARY

This disclosure provides various embodiments of systems, methods, and software for managing distributed index data. For example, in one embodiment, software for managing distributed index data may identify a query for one or more data objects from a data repository using a generic index, map the query to one of a plurality of logically distributed indices according to at least one rule, and execute the mapped query using the particular distributed index to retrieve the one or more data objects. Each distributed index may be in a disparate index repository. Also, each index repository may be stored on a disparate storage device. In some aspects, the one or more rules may include a plurality of business rules, as well as at least one technical rule. The rules may be stored in a rules repository. In further aspects, an administration view may be presented to a client such that one of the business rules is customized. Also, the plurality of distributed indices may include a first index associated with a particular business criteria and a second index associated with another particular business criteria.

In other embodiments, the software may receive a request to add a new data object to the data repository, parse the request to identify data for the one or more rules, and add index data to one of the distributed indices as the data object is stored based on the identified data and the rules. In further aspects, the software may receive a request to reorganize the data repository based on a business occurrence, identify one of the distributed indices based on the business occurrence, and reorganize the data repository according to the identified distributed index. In some aspects, the reorganization of the data may further include archiving a subject of the data repository to a backup repository and dropping the identified distributed index from the plurality of distributed indices. In yet further aspects, the software may maintain an audit trail of a first of the rules as the first rule changes.

Each of the foregoing, as well as other disclosed example methods, may be computer implementable. Moreover, some or all of these aspects may be further included in respective systems and software for managing distributed index data. The details of these and other aspects and embodiments of the disclosure are set forth in the accompanying drawings and the description below. Features, objects, and advantages of the various embodiments will be apparent from the description and drawings, and from the claims.

DESCRIPTION OF DRAWINGS

FIG. 4 is a flowchart illustrating an addition of data to a data repository according to a particular implementation of the present disclosure;

FIG. 5 is a flowchart illustrating a reorganization of data in a data repository according to a particular implementation of the present disclosure;

FIG. 6 illustrates an example client viewpoint for customizing distributed indices in some fashion.

DETAILED DESCRIPTION

Figure 1:
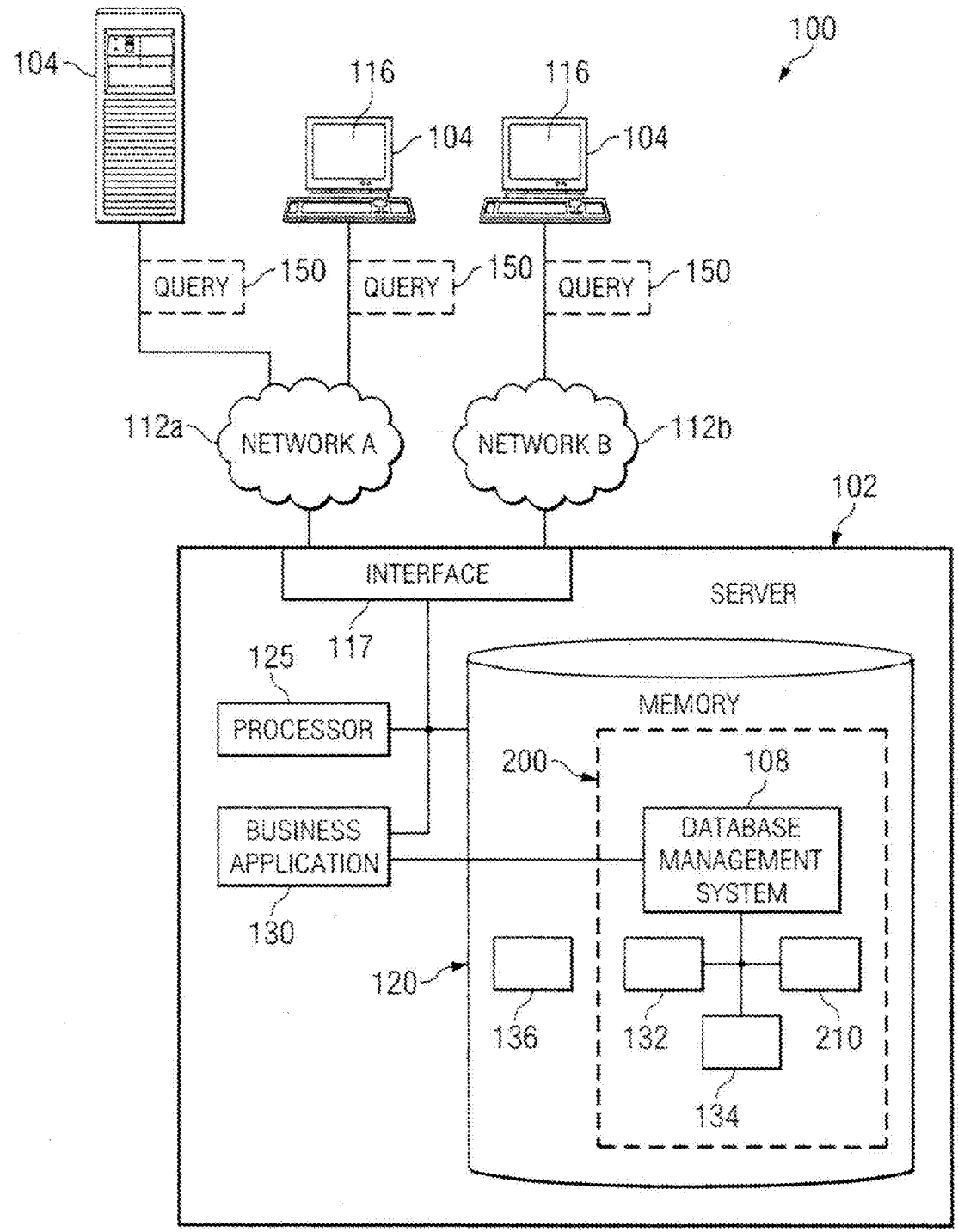
FIG. 1 illustrates a database environment implementing or managing distributed index data in accordance with one embodiment of the present disclosure.

FIG. 1 illustrates a database environment 100 for implementing or managing distributed index data 232 in at least a portion of an enterprise or data processing environment. At a high level, database environment 100 can implement techniques that may map index data 232 to various logically distributed indices in index repositories 132 relative to one or more predefined mapping rules 234 that may, in some cases, be defined by a client 104 or user. The index data 232 is generally managed in a hierarchical organized storage-system (main memory, cache, hard drive, and so forth) that facilitates database processing in light of business considerations. In other words, database environment 100 may unambiguously map index data 232 to a distinct logically distributed index in index repository 132 according to the predefined mapping rules 234. When appropriate, the index data 232 may be accessed via an appropriate interface and merged, such as with reports including current and historical transactions. In this way, each usual, standard, or generic index that is utilized by various applications can be (logically or physically) divided into various repositories or devices. Database environment 100 may, in some cases, allow Information Lifecycle Management (ILM) to be more easily supported, e.g., information related to sales, purchases, or mergers of businesses. Reorganization of business data, as well as merging of data from different systems or environments, may be simplified. Further, indexing systems may be more highly scalable. Query performance may be increased, for example, become faster. Also, parallel index access may be supported across distributed indices.

Environment 100 may be a distributed client/server system that allows clients 104 to submit requests to store and/or retrieve information from data repository 210 maintained on server 102. But environment 100 may also be a standalone computing environment or any other suitable environment, such as an administrator accessing data stored on server 102, without departing from the scope of this disclosure. Turning to the illustrated embodiment, database environment 100 includes server 102 coupled to one or more clients 104 through one or more networks 112. Server 102 includes interface 117, memory 120, processor 125, and business application 130 and comprises an electronic computing device operable to receive, transmit, process, and store data associated with environment 100. For example, server 102 may be any computer or processing device such as a mainframe, a blade server, a general-purpose personal computer (PC), a Macintosh, a workstation, a Unix-based computer, or any other suitable device. Generally, FIG. 1 provides merely one example of computers that may be used with the disclosure. In other words, the present disclosure contemplates computers other than general purpose computers, as well as computers without conventional operating systems. As used in this document, the term "computer" is intended to encompass a personal computer, workstation, network computer, or any other suitable processing device. For example, although FIG. 1 illustrates one server 102 that may be used with this disclosure, environment 100 can be implemented using computers other than servers, as well as a server pool. Server 102 may be adapted to execute any operating system including z/OS, Linux-Intel or Linux/390, UNIX, Windows Server, or any other suitable operating system. According to one embodiment, server 102 may also include or be communicably coupled with a web server and/or an SMTP server. Server 102 can accept data from client 104 via a web browser (e.g., Microsoft Internet Explorer or Mozilla Firefox) and return the appropriate HTML or XML responses using network 112. For example, server 102 may receive such an SQL query from client 104 using the web browser and then execute the parsed query to store and/or retrieve information in data repository 210.

Server 102 includes memory 120, which may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database system 200 and audit trail 136.

Database system 200 includes database management system 108, data repository 210, index repository 132, and rules repository 136. In some implementations, database management system 108 is coupled to data repository 210, index repository 132, and rules repository 136 within database system 200. In other implementations, index repository 132 and rules repository 134 may reside external to database system 200, yet remain coupled to database management system 108. In short, illustrated database 200 is meant to represent a local or distributed database, warehouse, or other information repository that includes or utilizes various components.

In more detail, data repository 210 may store data in a relational format, thus allowing database environment 100 to provide access to such data in data repository 210 using a structured query language (SQL), which may include any of the plurality of versions of the SQL relational database query and manipulation language such as, for example, SEQUEL, ANSI SQL, any other proprietary or public variant of SQL, or other suitable or generic query language (such as eXtensible Markup Language (XML)). Data repository 210 is coupled to and accessed, called, or otherwise managed by database management system 108. In some cases, data may be stored in data repository 210 as data objects, records, or elements. In the case of relational or other indexed storage schemes, data repository 210 contains one or more general indices that include index data related to the data objects in data repository 210.

Generally, database management system 108 is typically software that manages data repository 210, performs tasks associated with database management, and/or responds to queries, including storing information in memory 120, searching data repository 210, generating responses to queries using information in data repository 210, and numerous other related tasks. For example, database management system 108 may be any database management software such as, for example, a relational database management system, a database management system using flat files or CSV files, an Oracle® database, a structured query language (SQL) database, and the like. As used herein, software generally includes any appropriate combination of software, firmware, hardware, and/or other logic. For example, database management system 108 may be written or described in any appropriate computer language including, for example, C, C++, Java, Visual Basic, assembler, Perl, ABAP, any suitable version of 4GL, or any combination thereof. It will be understood that while database management system 108 is illustrated in FIG. 1 as a single multi-tasked module, the features and functionality performed by this engine may be performed by multiple modules such as, for example, one or more agents or database instances. Further, while illustrated as internal to server 102, one or more processes associated with database management system 108 may be stored, referenced, or executed remotely. Moreover, database management system 108 may be a child or sub-module of another software module (such as data repository 210) without departing from the scope of this disclosure.

In particular embodiments, database management system 108 accesses data repository 210 in response to queries 150 from clients 104. In some cases, database management system 108 may determine that business data stored in data repository 210 should be modified or reorganized due to a business occurrence, such as a reorganization of a business, e.g., a sale of the business. The modification or reorganization may result in the elimination or partial elimination of one or more particular index repositories 132. Prior to the elimination of the particular index repositories 132, index data 232 related to the index repositories 132 may be stored in a backup data repository.

Continuing with FIG. 1, database system 200 may include an index repository 132, which (although shown as a single index repository 132) may be multiple index repositories 132. Multiple index repositories 132 may be hosted on several distinct computers or servers connected by a network. Index repositories 132 may be coupled to database management system 108, allowing the system 108 to access, retrieve, or otherwise communicate with repositories 132. In some implementations, the index repository 132 contains a number of logically distributed indices. In other embodiments, multiple index repositories 132 may each contain one or more distributed indices. Such logically disparate repositories 132 may physically located on distinct components such as, for example, client 104 or server 102 or on the same component as appropriate. Each logically distributed index may be created through the application of predefined mapping rules 234 to one or more general indices stored in data repository 210. Index data 232, which may be data object attributes contained in data objects stored in data repository 210, may be mapped from the general indices to the logically distributed indices stored on index repositories 132. Thus, each data object attribute may be mapped to a distinct distributed index in index repository 132 relative to a certain user-definable criteria, for example, the predefined mapping rules 234. The predefined mapping rules 234 may be related to business data such as, for example, business data generated through the purchase or sale of a business. For instance, the business data may contain information related to the purchase price, purchase entities, and terms of the transaction. Thus, particular mapping rules 234 related to purchase price, purchase entities, and transaction terms may be applied to the business data by database management system 108 automatically, in order to map the business data to corresponding distributed indices (i.e., indices containing index data related to purchase prices, purchase entities, and transaction terms, respectively) contained in index repositories 132.

Database system 200 may also include a rules repository 134, which, in the illustrated embodiment, is coupled to database management system 108. As with index repository 132, rules repository 134 may be multiple rules repositories 134 without departing from the scope of this disclosure. Rules repository 134 may store the predefined mapping rules 234 determined by client 104, business application 130, or other user. In general, the predefined mapping rules 234 may define distribution criteria or attributes of a data object meaningful to and customizable by client 104. Meaningful distribution criteria may be related to particular aspects of a business, such as revenue, profits, costs, supplier information, or customer information, to name but a few. The application of the predefined mapping rules 234 to one or more general indices stored in data repository 210 may result in the mapping of the index data 232 contained in the general indices to one or more logically distributed indices in index repositories 132. The rules may include business oriented rules. The rules may also include technical rules such as, for example, rules that may check the performance of the logically distributed indices stored in index repositories 132 and otherwise manage the application of the business rules to index data 232.

As shown further in FIG. 1, memory 120 may also include audit trail 136. Audit trail 136 may store prior instances of the predefined mapping rules 234 customized by, in some cases, client 104 or business application 130. For example, client 104 may determine that one or more particular mapping rules 234 should be changed or adjusted based upon an addition, subtraction, or change of particular business data. The mapping rules 234 may be adjusted, which may result in a current mapping of particular business data different from a prior mapping of particular business data. Continuing the example from above, client 104 may determine that business data related to a purchase of a business, such as revenue data related to the transaction generated during a particular time interval, should be mapped to a distributed index containing index data related to business data generated during the particular time interval, rather than a distributed index containing revenue index data. Through an adjustment of the mapping rules 234, client 104 may ensure that the revenue data is mapped to the correct distributed index contained in index repository 132, i.e., the distributed index containing business data related to the particular time interval. Audit trail 136 may, for example, contain the previous mapping rule that would have mapped revenue data to a distributed index containing revenue data. Client 104 may then, at a later time for instance, access audit trail 136 to review prior mapping rules relative to current mapping rules 234.

Returning to the illustrated server 102, this server 102 may include processor 125, which executes instructions (such as the logic or software described above) and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with database management system 108. For example, processor 125 may execute an algorithm that maps index data 232 from one or more general indices in data repository 210 to a particular logically distributed index in index repository 132 relative to the predefined mapping rules 234 stored in rules repository 134. Although FIG. 1 illustrates a single processor 125 in server 102, multiple processors 125 may be used according to particular needs and reference to processor 125 is meant to include multiple processors 125, where applicable.

Server 102 may also include or reference a local, distributed, or hosted business application 130. In certain embodiments, business application 130 may request access to retrieve, modify, delete, or otherwise manage the information of one or more database systems 200 in memory 120. Business application 130 may be considered business software or solution that is capable of interacting or integrating with database systems 200 located, for example, in memory 120 to provide access to data for personal or business use. An example business application 130 may be a computer application for performing any suitable business process or logic by implementing or executing a plurality of steps. Business application 130 may also provide the user, such as an administrator, with computer implementable techniques that may result in the management of distributed index data 232. More specifically, business application 130 may facilitate or help facilitate the functionality of database system 200 for, in some cases, client 104, e.g., functionality related to mapping index data 232 to one or more logically distributed indices in index repositories 132, adding data objects to data repository 210, or reorganizing data in data repository 210.

Server 102 may also include interface 117 for communicating with other computer systems, such as client 104, over network 112 in a client-server or other distributed environment. In certain embodiments, server 102 receives queries 150 for data access from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Database environment 100 also may include network 112, which facilitates wireless or wireline communication between server 102 and any other local or remote computer, such as clients 104. Indeed, while illustrated as two networks, 112a and 112b, respectively, network 112 may be a continuous network without departing from the scope of this disclosure, so long as at least portion of network 112 may facilitate communications between senders and recipients of queries 150 and results. In other words, network 112 encompasses any internal and/or external network, networks, sub-network, or combination thereof operable to facilitate communications between various computing components in database environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Database environment 100 may also include one or more clients 104. Client 104 may be any local or remote computing device operable to receive requests from the user via a user interface 116, such as a GUI, a Command Line Interface (CLI), or any of numerous other user interfaces. Thus, where reference is made to a particular interface, it should be understood that any other user interface may be substituted in its place. In various embodiments, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries 150 via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

Client 104 may transmit query 150 to server 102 to access a data object from data repository 210. Generally, query 150 may be a request to access the data object based upon a particular attribute value of the data object. In order to access the data object, query 150 may be mapped to index repository 132 based on the predefined mapping rules 234 stored in rules repository 134. The mapped query 150 may be executed by processor 125 to retrieve the data object containing the queried attribute value using the index repository 132.

GUI 116 may include a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. GUI 116 may provide access to the front-end of business application 130 executing on client 104 that is operable to add or modify data objects of data repository 210 or also, to reorganize data repository 210. In some cases, GUI 116 may provide access to the front-end of business application 130 executing on client 104 that is operable to add new mapping rules 234 or modify existing mapping rules 234 to rules repository 134. In a further example, GUI 116 may display output reports such as summary and detailed reports. GUI 116 may comprise a plurality of customizable frames or views having interactive fields, pull-down lists, and buttons operated by the user. In one embodiment, GUI 116 may present information associated with queries 150 and receive commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user.

Figure 2:
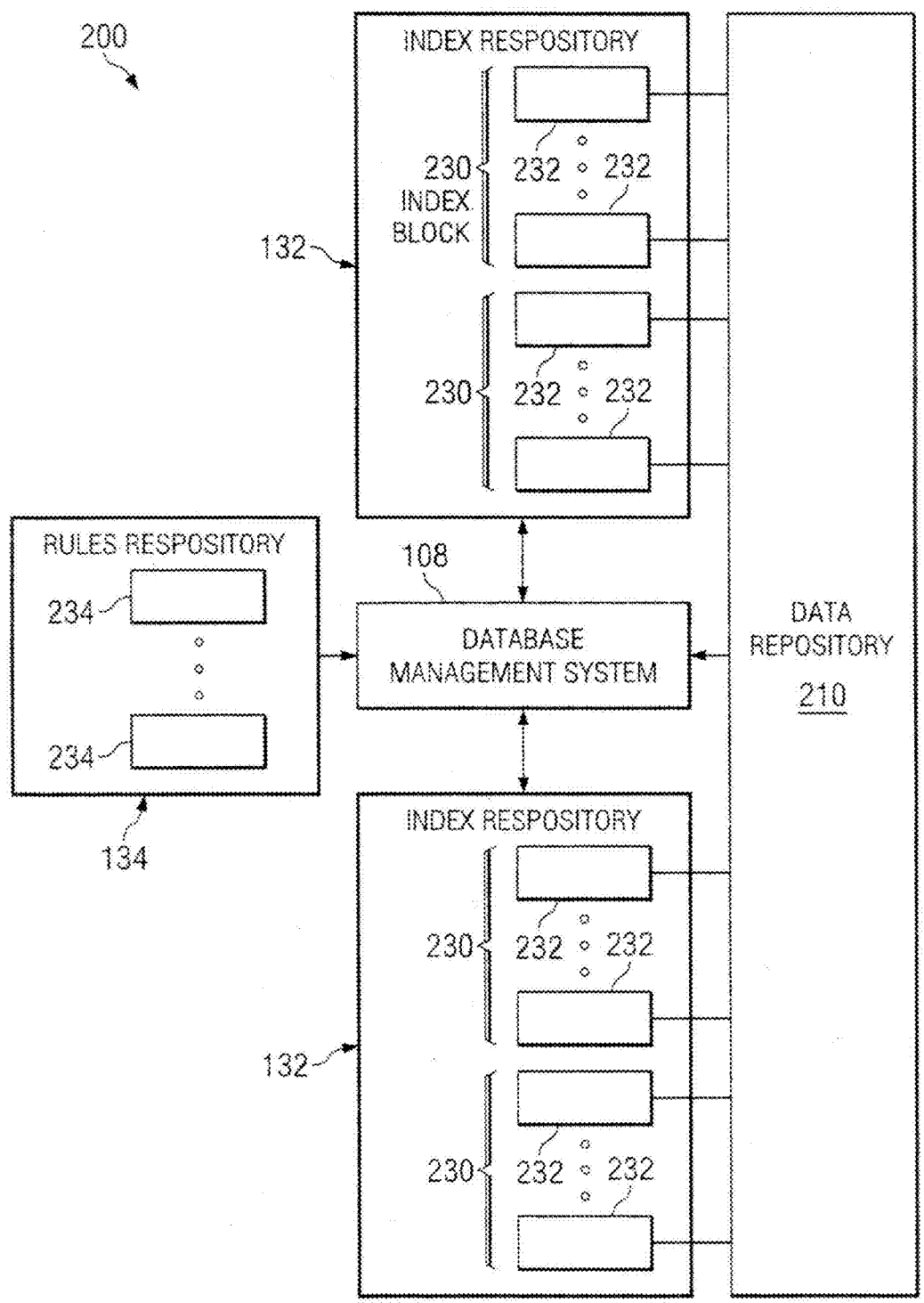
FIG. 2 illustrates a more detailed configuration of the database management system of FIG. 1.

FIG. 2 illustrates an example database system 200 for managing distributed index data for a database. In general, system 200 includes at least one data repository 210, one or more index repositories 132, rules repository 134, and a database management system 108 that may be accessed by a variety of clients 104, including applications such as, for example, business application 130, and other users. A user or application client may request data from database management system 108 via a personal computer, server, touch-screen terminal, workstation, network computer, kiosk, wireless data port, smart phone, personal data assistant (PDA), one or more processors within these or other devices, or any other suitable processing device for accessing data.

In more detail, data repository 210 may be, for example, an intra-enterprise, inter-enterprise, regional, nationwide, or substantially national electronic storage facility, data processing center, archive, hard disk, tape storage, and the like that allows storage of data objects. Data repository 210 may include a single or multiple computers, a single or multiple data storage devices, a single or multiple servers, and the like. As such, data repository 210 may reside on a single device or may be distributed across multiple devices via a network or networks. Data repository 210 may be a database or include a database that contains data objects. Although described as a database, data repository 210 may be any appropriate software and/or hardware that stores data in an organized fashion. Data objects may be, for example, business data objects (i.e., data objects related to business processes) or other objects. The data objects typically include a key, a type, and one or more attributes. The key may uniquely identify the data object (or may uniquely identify the data object in combination with the type). The type identifies the type of data object and may be the descriptive name of the data model used for the data object. For example, the type of data object may be "product," "business partner," "customer," and the like. The attributes are properties or characteristics of the data object. For example, the attributes of a product-type data object may include a product model number, a product price, a product description, and the like. Likewise, the attributes of a business partner-type data object may include the business partner's name, address, phone number, and the like.

Because data repository 210 may become very large and may be distributed over multiple devices via a network 112, index repositories 132 can be used to allow quicker and more efficient database searches. The index data 232 may be contained in logically distributed indices within index repositories 132. The index repositories 132, however, may not include all of the information contained in data repository 210. For example, a single index repository 132 typically may not include all of the data objects and may not include any of the attributes of such data objects. The index repository 132 may include related attribute values of the data objects stored in data repository 210 based on the predefined mapping rules 234 in rules repository 134. For example, a particular distributed index in an index repository 132 may contain attribute values of multiple data objects stored in data repository 210 related to business partners of a business entity, for example, the names of the business partners. Thus, a query 150 for a particular business partner object may contain only the business partner name. In this manner, rather than directly searching through one or more generic indices within data repository 210, database management system 108 may map the query to the particular distributed index containing business partner names stored in index repository 132. Thus, database management system 108 may only search through the particular distributed index, which is typically much smaller than the one or more generic indices contained in data repository 210. When database management system 108 finds relevant data in the business partner name distributed index in index repository 132, it may then access data repository 210 to retrieve the data object, i.e., the business partner object containing the attribute of the queried business partner name.

While the illustrative embodiment in FIG. 2 includes two index repositories 132, more than two index repositories 132 containing index data 232 may be utilized. The index repository 132 is typically stored in a hierarchical manner and thus, may be located in various devices across a network. For example, index repository 132 may be stored in a database, a hard disk, a cache, in main memory, and the like. As shown in the illustrated embodiment, index repository 132 is organized into blocks 230 of individual index data 230. Each index block 230 includes individual index data 232. Database management system 108 may read and analyze the index data 232 on a block-by-block basis. When database management system 108 searches the index repository 132, it may cause an entire block 230 of individual index data 232 to be copied from a hard disk (or other persistence) to main memory (possibly across a network). Then, database management system 108 reads through the block 230 of individual index data 232 to search for some particular information. If database management system 108 does not find the particular information, it may read another block 230 of index data 232 from hard disk to main memory, and so on, until it does find the particular information (or until reaching some threshold for searching).

For example, upon receiving a query 150 from client 104 for a particular data object containing a specified attribute value, the query 150 may be mapped to a particular logically distributed index stored in index repository 132 according to predefined mapping rules 234, which can be stored in rules repository 134. Thus, database management system 108 may search only the index repository 132 to which the query 150 is mapped. In this manner, database management system 108 may be able to quickly find a particular data object—often without having to search through non-relevant data objects, as well as non-relevant index repositories 132 and thus, non-relevant index data 232.

Database environment 100 may facilitate or help facilitate various functional aspects implemented by client 104, business application 130, or any other user of environment 100 or database management system 108. Database management system 108 may perform several functions, some of which are described in more detail below along with flowcharts contained in the figures included herein.

Figure 3:
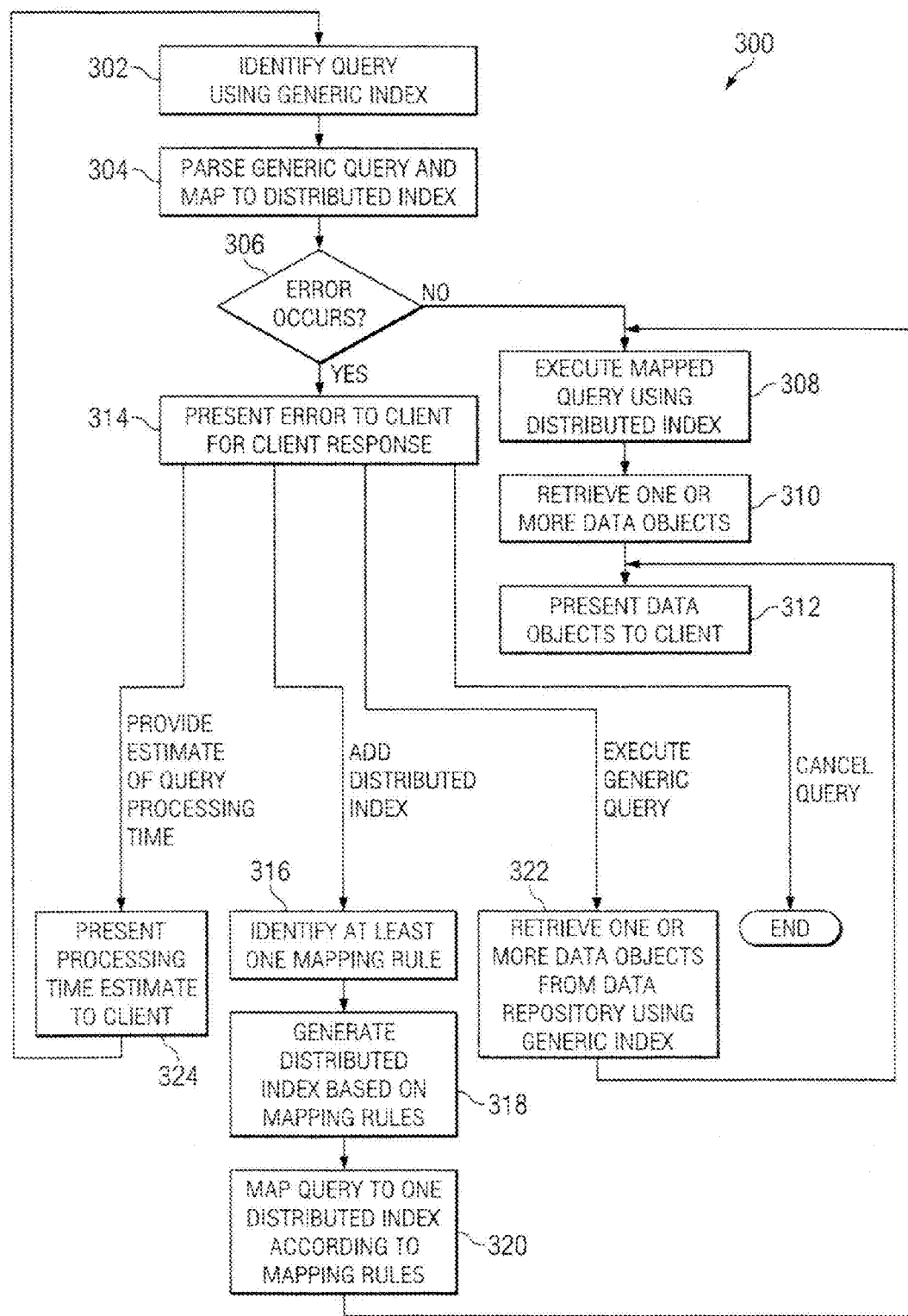
FIG. 3 is a flowchart illustrating management of distributed index data according to a particular implementation of the present disclosure.

FIG. 3 illustrates an example method 300 for managing distributed index data 232 by a database management system, for example, database management system 108 in database environment 100. Generally, method 300 describes a retrieval of one or more data objects from data repository 210 based on an identified query. At step 302, database management system 108 identifies a query 150 using a generic index stored on data repository 210. Query 150 may be received from client 104 through network 112, but query 150 may also be received by database management system 108 from business application 130 or any other appropriate network, server, or user. For example, client 104 may issue a command to reorganize all or part of the data repository 210. In this case, database management system 108 would receive the command and identify the appropriate query to execute. In step 304, database management system 108 then parses the generic query 150 and maps query 150 to a logically distributed index such as, for example, an index in index repository 132. However, in some cases, an attempt to map query 150 to a logically distributed index may generate an error, as shown in step 306. If an error does not occur, database management system 108 executes the mapped query 150 using the logically distributed index in step 308, thus matching a data object attribute in query 150 to index data 232 stored in index repository 132. In step 310, database management system 108 retrieves one or more data objects from data repository 210 based on the matched index data 232 in index repository 132. Next, the database management system 108 presents the retrieved data objects from data repository 210 to client 104, business application 130, or any other appropriate server, network, or user.

Should an error occur, database management system 108 presents the error for response in step 314. The error may be presented to client 104, business application 130, or other appropriate network, server, or user. The error may occur for several reasons. For example, an error may occur if database management system 108 attempts to map an add statement 150 to a logically distributed index without sufficient memory. As another example, an error may occur if database management system 108 attempts to map query 150 to a logically distributed index that has yet to be generated. As a further example, an error may occur if the mapping may take a substantial amount of time.

Continuing with method 300, there may be several possible responses to the presentation of an error by database management system 108, some of which are illustrated. For example, one response may be to request database management system 108 to add a logically distributed index to an index repository 132. In step 316, database management system 108 identifies at least one mapping rule. The mapping rule may be a new mapping rule received by client 104, business application 130 or alternatively, client 104 may modify or otherwise utilize an existing mapping rule 234 stored in rules repository 134. Next, database management system 108 generates a logically distributed index based on one or more mapping rules in step 318. Database management system 108 then maps query 150 to the generated distributed index based on the one or more identified mapping rules in step 320. In step 308, database management system 108 next executes the mapped query 150 using the logically distributed index, thus matching a data object attribute in query 150 to index data 232 in the distributed index stored in index repository 132. In step 310, database management system 108 retrieves one or more data objects from data repository 210 based on the matched index data 232 in index repository 132. Next, the database management system 108 presents the retrieved data objects from data repository 210 to client 104, business application 130, or any other appropriate server, network, or user.

Another response to the presentation of an error by database management system 108 is to request system 108 to execute the generic query 150. Database management system 108 retrieves one or more data objects from data repository 210 using a generic index stored in data repository 210 in step 322. In this case, database management system 108 may search through all index data stored in the generic index to match query 150. Database management system 108 then presents the retrieved data objects to client 104, business application 130, or any other appropriate network, server, or user.

A third possible response to the presentation of an error by database management system 108 may be to cancel the query 150. If client 104 or business application 130 responds by canceling the query 150, database management system 108 may not perform any additional action in method 300.

A further possible response to the presentation of an error by database management system 108 may be to request system 108 to provide an estimate of query processing time. Database management system 108 would then determine query processing time and present the processing time to client 104, business application 130, or other appropriate entity in step 324. In some cases, database management system 108 would return to step 302 to identify the next (or potentially the same) query using a generic index from client 104.

FIG. 4 illustrates an example method 400 for adding data objects to a data repository using a database environment, for example, database environment 100. Generally, method 400 allows a client, for example, client 104, or application such as business application 130, to add data objects to data repository 210 utilizing database management system 108 and database environment 100. In step 402, database management system 108 receives a request to add a new data object from client 104, business application 130, or other appropriate network, server, or user. In some cases, client 104 may utilize the front-end of business application 130 to request the addition of a new data object to data repository 210. In other cases, client 104 may send the new data object to business application 130, which then automatically requests database management system 108 to add the new data object. In step 404, database management system 108 parses the new data object into one or more attribute values according to predefined mapping rules 234 stored in rules repository 134. Once database management system 108 has parsed the received data object into one or more attribute values, the attribute values are added to one or more logically distributed indices in one or more index repositories 132 as index data 232, in step 406. In step 408, database management system 108 stores the new data object in data repository 210, where it may be retrieved through subsequent queries 150.

As a more specific example to method 400, client 104 may add a new data object to data repository 210 representing an acquisition of a new business entity such as, for example, a purchase of the new business entity. The data object representing the new business entity may be parsed into multiple attribute values, such as business name, business type (e.g., partnership, limited liability corporation, etc.), and business location, to name but a few examples. The business name, for instance, may be added as index data 232 to a logically distributed index containing the names of other purchased businesses stored in an index repository 132. All, or substantially all, of the new business entity data object may be stored in data repository 210.

FIG. 5 illustrates an example method 500 for reorganizing data in a data repository using a database environment, for example, database environment 100. Generally, method 500 allows a client, for example, client 104, or application such as business application 130, to reorganize only part of data repository 210 utilizing database management system 108 and the rules repository. For example, in step 502, database management system 108 receives a request (or command) to reorganize data repository 210 based on a business occurrence and the archival/purging of a (perhaps sizeable) portion of the data because of this occurrence. Such occurrences may include, for example, acquisition or dissolution of a business entity (company, subsidiary, depart, etc.), new fiscal year, new product line or release, changes in legal requirements, new sales territories, and such. The request may come from client 104 directly to database management system 108, as one example, or client 104 may utilize business application 130 to generate the request. In step 504, database management system 108 identifies a logically distributed index in an index repository 132 based on the business occurrence and the mapping rules. Next, in step 506, database management system 108 archives data related to the business occurrence in a backup data repository. The backup data repository may be located on server 102, client 104, at a remote location connected to server 102 through network 112, or in removable storage media such as a magnetic computer disk, CD-ROM, or other suitable media. In step 508, database management system 108 drops the identified logically distributed index located in index repository 132. In some cases, database management system 108 may move the identified distributed index associated with the subject from the plurality of distributed indices to the backup repository, and often any associated mapping rules (or the pointers thereto, which may be embedded in the moving index). In these cases, this could allow clients 104 (or database management system 108) to more quickly and efficiently process archived data. It may also destroy the subject of the data repository when the identified distributed index is dropped from the plurality of distributed indices.

Using one of the specific examples of method 500, the business occurrence may be the sale of a subsidiary business entity by a parent business entity, thus requiring the reorganization of data repository 210 by the parent entity to, for example, archive or purge data in data repository 210 related to the subsidiary business entity. The identified logically distributed index may include index data 232 related to the sold business subsidiary. While the parent entity may not desire to have information related to the sold subsidiary in data repository 210, i.e., for security concerns or memory constraints, the parent entity may want to archive the information for later retrieval at a subsequent time, as required. Therefore, in this example, all (or substantially all) data objects related to the subsidiary entity may be archived from data repository 210 to the backup data repository. Database management system 108 may then drop the distributed index related to the sold business entity from index repository 132.

Figure 7:
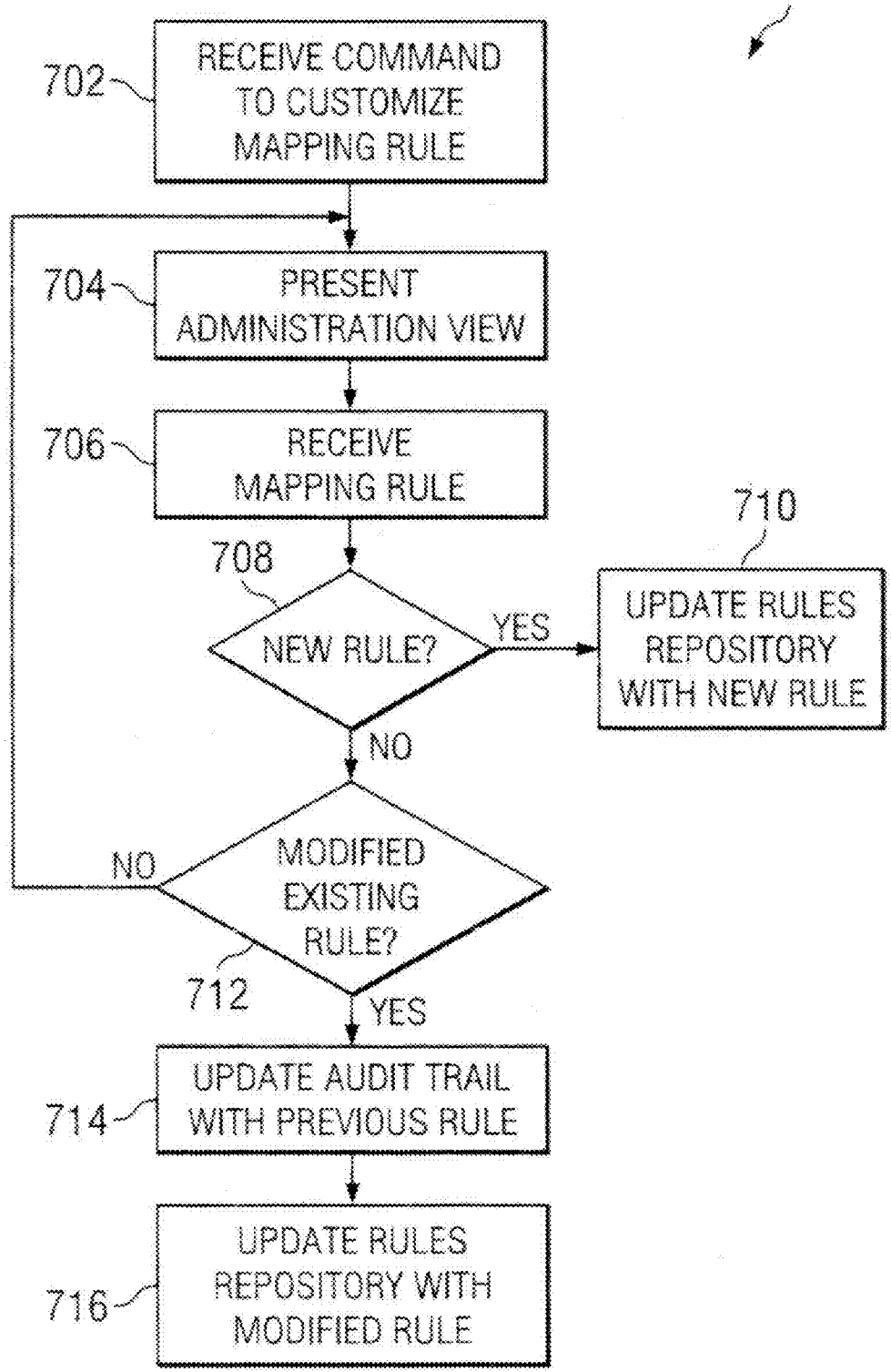
FIG. 7 is a flowchart illustrating an addition to or modification of mapping rules for managing distributed index data through the client viewpoint illustrated in FIG. 6.

FIG. 7 illustrates an example method 700 for adding or modifying predefined mapping rules 234 through GUI 116 in a database environment such as, for example, database environment 100. GUI 116 may present an interface for adding or modifying mapping rules 234 in a same or substantially similar viewpoint as shown in FIG. 6. In step 702, the database management system 108 receives a command to customize a mapping rule. The command may be generated by client 104 or, in some cases, may be generated through business application 130. In step 704, database management system 108 presents an administration view, illustrated in FIG. 6, to client 104. The administration view may, for example, be presented to the client 104 by GUI 116 through the front-end of business application 130. Generally, the administration view may allow client 104 to add new mapping rules to rules repository 134, as well as modify existing mapping rules 234 in rules repository 134.

Continuing with method 700, in step 706, database management system 108 may receive a mapping rule from client 104. Database management system 108 determines if the mapping rule is a new mapping rule, i.e., unrelated to any existing mapping rule, in step 708. As illustrated in FIG. 6, client 104 may choose to add a new mapping rule by specifying an object type and object attribute of a data object in data repository 210. For example, certain data objects in data repository 210 may be customer-type, with attributes of customer name, address, billing cycle, and the like. Client 104 may specify an existing object type or add a new object type, as shown. Furthermore, client 104 may specify an existing object attribute or add a new object attribute. For instance, client 104 may add a mapping rule that maps index data 232 of a particular attribute, for example, shipping address, to a corresponding distributed index in index repository 132. If customer-type is an existing object type, client 104 may choose this type. Likewise, if customer name is an existing object attribute, client 104 may choose this attribute.

If the received mapping rule is a new mapping rule, database management system 108 updates the rules repository 134 with the new mapping rule in step 710. The administration view may be configured to automatically apply the new rule to subsequent queries by client 104, as well as automatically add the new rule to rules repository 134 by default, as illustrated by the "checked" boxes in FIG. 6. However, client 104 may be allowed to deselect these features of administration view.

If the received mapping rule is not a new rule, database management system 108 determines if it is a modified existing mapping rule in step 712. Turning to FIG. 6, client 104 may also modify an existing mapping rule through the administration view. As illustrated, client 104 may choose an existing rule from a drop-down menu. The existing rule may map index data 232 matching these criteria to the corresponding logically distributed index in index repository 132. The client 104 may choose an alternative or additional object attribute for the existing rule from a drop-down menu, as shown. As a more specific example, a particular mapping rule 234 may map data object attributes related to a product model batch number, i.e., a number associated with a manufacturing cycle, stored in a generic index in data repository 210 to a corresponding distributed index in index repository 132, thus allowing client 104 to retrieve data objects for the product models containing this attribute through a query 150 for this attribute. Client 104 may choose to modify this mapping rule 234 to more broadly retrieve all product models without regard to the associated batch number. Thus, client 104 may utilize the administration view to replace the batch number attribute in the existing mapping rule 234 with a model attribute, thereby modifying the existing mapping rule.

Continuing with method 700, if database management system 108 determines that the received mapping rule is not a modified mapping rule in step 712, e.g., it is an invalid mapping rule, the database management system 108 presents the administration view to client 104 again to allow for entry of a valid mapping rule in step 704. An error message may also be generated by the administration view. However, if the received mapping rule is a modified existing mapping rule, then database management system 108 updates audit trail 136 with the unmodified existing mapping rule in step 714. Next, database management system 108 updates the rules repository 134 with the modified mapping rule in step 716. Although database management system 108 may automatically update audit trail 136 and rules repository 134, client 104 may also control these features in the administration view, as illustrated in FIG. 6 through corresponding selectable boxes. In some instances, client 104 may be assigned a security level that dictates whether client 104 may operate the full functionality of the administration view. A lower security level may, for example, prevent access to certain functionality of the administration view by client 104 such as, for example, the updating functionality described above.

The preceding flowcharts and accompanying description illustrate example methods. Database environment 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, database environment 100 may use methods with additional steps, fewer steps, and/or different steps, so long as the methods remain appropriate. In short, although this disclosure has been described in terms of certain embodiments and generally associated methods, alterations and permutations of these embodiments and methods will be apparent to those skilled in the art. Accordingly, the above description of example embodiments does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A tangible computer-readable article for managing distributed index data, the article storing instructions that are operable when executed by a processor to:

load a plurality of rules associated with business attributes of one or more data objects in a data repository, wherein the one or more data objects are indexed using a plurality of logically distributed indices, each logically distributed index comprising an index of a subset of the one or more data objects, wherein data objects indexed in each logically distributed index share at least one common business attribute determined at least in part by the plurality of rules;

identify a query for one or more data objects from the data repository, the query targeting a generic index of data objects in the data repository, wherein the query includes an attribute associated with a particular logically distributed index;

map the query to the particular logically distributed index according to at least one of the plurality of rules and the attribute associated with the particular logically distributed index; and execute the mapped query against the particular distributed index to retrieve the one or more data objects, wherein the mapped query is executed against the particular distributed index without executing the mapped query against any other of the plurality of logically distributed indices and without using the generic index.

2. The article of claim 1, each distributed index being stored in a logically disparate index repository.

3. The article of claim 2, each index repository stored on a disparate storage device.

4. The article of claim 1, the rules stored in a rules repository.

5. The article of claim 1, the rules further comprising at least one technical rule.

6. The article of claim 1 further storing instructions operable when executed to present an administration view to a client such that one of the business rules is customized.

7. The article of claim 1, the plurality of distributed indices comprising a first index associated with a particular business criteria and a second index associated with another particular business criteria.

8. The article of claim 1 further storing instructions operable when executed to:

receive a request to add a new data object to the data repository;

parse the request to identify data for the plurality of rules; and add index data to one of the distributed indices as the data object is stored based on the identified data and the plurality of rules.

9. The article of claim 1 further storing instructions operable when executed to:

receive a request to reorganize the data repository based on a business occurrence;

identify one of the distributed indices based on the business occurrence; and reorganize the data repository according to the identified distributed index.

10. The article of claim 9, the reorganization of the data comprising:

archiving a subject of the data repository to a backup repository;

moving the identified distributed index associated with the subject from the plurality of distributed indices to the backup repository;

destroying the subject of the data repository; and dropping the identified distributed index from the plurality of distributed indices.

11. The article of claim 1 further storing instructions operable when executed to maintain an audit trail of a first of the rules as the first rule changes.

12. A computer-implemented method performed by one or more processors for managing distributed index data stored in memory, the method comprising the following steps performed by one or more processors:

loading a plurality of rules associated with business attributes of one or more data objects in a data repository, wherein the one or more data objects are indexed using a plurality of logically distributed indices stored in memory, each logically distributed index comprising an index of a subset of the one or more data objects, wherein data objects indexed in each logically distributed index share at least one common business attribute determined at least in part by the plurality of rules;

identifying a query for one or more data objects from the data repository, the query targeting a generic index of data objects in the data repository, wherein the query includes an attribute associated with a particular logically distributed index;

mapping the query to the particular logically distributed index stored in memory according to at least one of the plurality of rules and the attribute associated with the particular logically distributed index; and executing the mapped query against the particular distributed index to retrieve the one or more data objects, wherein the mapped query is executed against the particular distributed index without executing the mapped query against any other of the plurality of logically distributed indices and without using the generic index.

13. The method of claim 12, each distributed index in a disparate index repository that is stored on a disparate storage device.

14. The method of claim 12, the one or more rules comprising a plurality of business rules and at least one technical rule.

15. The method of claim 14, the rules stored in a rule repository.

16. The method of claim 14 further comprising presenting an administration view to a client such that one of the business rules is customized.

17. The method of claim 12 further comprising:

receiving a request to add a new data object to the data repository;

parsing the request to identify data for the plurality of rules; and adding index data to one of the distributed indices as the data object is stored based on the identified data and the plurality of rules.

18. The method of claim 12 further comprising:

receiving a command to reorganize the data repository based on a business occurrence;

identifying one of the distributed indices based on the business occurrence; and reorganizing the data repository according to the identified distributed index.

19. The method of claim 18, the reorganizing of the data repository further comprising:

archiving a subject of the data repository to a backup repository;

moving the identified distributed index associated with the subject from the plurality of distributed indices to the backup repository;

destroying the subject of the data repository; and dropping the identified distributed index from the plurality of distributed indices.

20. The article of claim 1, wherein one of the data objects is associated with two logically distributed indices.

21. The method of claim 12, wherein one of the data objects is associated with two logically distributed indices.

* * * * *